(12) United States Patent
Samwel et al.

(10) Patent No.: US 9,275,108 B1
(45) Date of Patent: Mar. 1, 2016

(54) EFFICIENT TOP-DOWN HIERARCHICAL JOIN ON A HIERARCHICALLY CLUSTERED DATA STREAM

(71) Applicant: Google Inc., Mountain View, CA (US)

(72) Inventors: Bart Samwel, Sunnyvale, CA (US); Chad Whipkey, Foster City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/665,272

(22) Filed: Mar. 23, 2015

Related U.S. Application Data (63) Continuation of application No. 13/798,973, filed on Mar. 13, 2013, now Pat. No. 8,990,187.

(60) Provisional application No. 61/649,857, filed on May 21, 2012.

(51) Int. Cl.
*G06F 17/30* (2006.01)

(52) U.S. Cl.
CPC ................... *G06F 17/30466* (2013.01)

(58) Field of Classification Search
CPC .................. Y10S 707/99935; G06F 17/30023; G06F 17/30466
USPC .......... 707/714, 718, 759, 760, 763, 765, 778
See application file for complete search history.

(56) References Cited

U.S. PATENT DOCUMENTS

| | | | |
|---|---|---|---|
| 5,713,015 A | 1/1998 | Goel et al. | |
| 5,774,692 A | 6/1998 | Boyer et al. | |
| 5,812,840 A | 9/1998 | Shwartz | |
| 5,864,847 A | 1/1999 | Goel et al. | |
| 5,875,447 A | 2/1999 | Goel et al. | |
| 5,960,427 A | 9/1999 | Goel et al. | |
| 5,974,407 A | 10/1999 | Sacks | |
| 6,279,007 B1 * | 8/2001 | Uppala | G06F 17/30961 |
| 6,965,903 B1 | 11/2005 | Agarwal et al. | |
| 6,985,905 B2 | 1/2006 | Prompt et al. | |

(Continued)

FOREIGN PATENT DOCUMENTS

EP 1121655 B1 7/2006

OTHER PUBLICATIONS

International Search Report and Written Opinion for Application No. PCT/US2013/037977 dated Aug. 23, 2013.

*Primary Examiner* — Cheryl Lewis
(74) *Attorney, Agent, or Firm* — Lerner, David, Littenberg, Krumholz & Mentlik, LLP (57) ABSTRACT

An apparatus for conducting a hierarchical join on a hierarchically clustered data stream is disclosed. The apparatus may include a memory storing query conditions that each determine whether a Structured Query Language query is suitable for performing a non-buffering read operation on a hierarchical data storage. A processor in communication with the memory may be configured to receive a Structured Query Language ("SQL") query from a client device and evaluate the SQL query for one or more of the query conditions stored in the memory. When the processor determines that the SQL query satisfies one or more of the query conditions, the processor may then perform a non-buffering read operation on the hierarchical data storage to obtain a hierarchically clustered data stream. The hierarchically clustered data stream may be evaluated to obtain a plurality of record results, which may be transmitted to the client device.

19 Claims, 3 Drawing Sheets

(56) References Cited

U.S. PATENT DOCUMENTS

| | | |
|---|---|---|
| 7,065,522 B2 | 6/2006 | Taylor et al. |
| 7,103,613 B2 | 9/2006 | Nouri |
| 7,167,859 B2 | 1/2007 | Shah et al. |
| 7,310,634 B2 | 12/2007 | Zwiegincew et al. |
| 7,526,503 B2 | 4/2009 | Bernstein et al. |
| 7,650,335 B2 | 1/2010 | Leetaru et al. |
| 7,680,767 B2 | 3/2010 | Adya et al. |
| 7,702,616 B1 | 4/2010 | Li et al. |
| 7,908,266 B2 | 3/2011 | Zeringue et al. |
| 7,925,656 B2 | 4/2011 | Liu et al. |
| 8,005,807 B2 | 8/2011 | Nouri et al. |
| 8,990,187 B2 * | 3/2015 | Samwel et al. ............... 707/714 |
| 2004/0243564 A1 | 12/2004 | Taylor et al. |
| 2005/0065927 A1 | 3/2005 | Nouri et al. |
| 2009/0024951 A1 | 1/2009 | Zeringue et al. |
| 2011/0074789 A1 | 3/2011 | Helfman et al. |
| 2011/0289069 A1 | 11/2011 | Hill |
| 2012/0084316 A1 | 4/2012 | Koenig et al. |

* cited by examiner

EFFICIENT TOP-DOWN HIERARCHICAL JOIN ON A HIERARCHICALLY CLUSTERED DATA STREAM

CROSS-REFERENCE TO RELATED APPLICATIONS

The present application is a continuation of U.S. patent application Ser. No. 13/798,973, filed Mar. 13, 2013 now U.S. Pat. No. 8,990,187, which claims the benefit of the filing date of U.S. Provisional Patent Application No. 61/649,857 filed May 21, 2012, the disclosure of which is hereby incorporated herein by reference.

BACKGROUND

A datacenter, or a system of interconnected datacenters, may use various types of data storage to store large amounts of data. The data may be made accessible to a customer and/or internal systems using an interface that accepts queries from a query language, such as the Structured Query Language ("SQL"). To access the data, the customer and/or internal systems may provide an SQL query to the interface residing on an intermediate server that facilitates access to the data residing in the data storage. A typical SQL query that the customer may pass to the intermediate server is a SQL query that includes the JOIN operation. The SQL query may contain additional clauses that specify further processing of the result of the join operation and other clauses, such as "WHERE" clauses, "GROUP BY" clauses, "HAVING" clauses, "ORDERED BY" clauses, and other such clauses as described by the SQL standard.

The data storage may be organized as part of a relational database. More particularly, the data of the relational database may be organized as a hierarchy. For example, suppose there is a set of database tables A, B, C, and D, where A is the parent, or root, of the hierarchy, B and D are children database tables of A, and C is a child database table of B. More particularly, each record of B may be a child of exactly one record of A, each record of C may be a child of exactly one record of B, and each record of D may be a child of exactly one row of A. In other words, a data set that conforms to the aforementioned hierarchy may be imagined as a set of hierarchical trees, each of which have a record of A at the top.

A customer and/or internal system may have access to this hierarchical data structure via the intermediate server discussed above. More particularly, the customer may perform one or more SQL operations on this hierarchical data structure, such as a SQL query that includes the "JOIN" operation. One example of a query that the customer may pass to the intermediate server may be "SELECT * FROM A [LEFT OUTER] JOIN B ON <predicates B> [LEFT OUTER] JOIN C ON <predicates C>," where, "[LEFT OUTER]" indicates that the "LEFT OUTER" operation is optional, and <predicates X> indicates a series of Boolean conjuncts on a table X and all preceding tables in the JOIN operation (e.g., tables A and B, or tables A, B, and C) similar to those described in the SQL standard. The query may also include a "WHERE" clause, where the predicates of the "WHERE" clause are a series of Boolean conjuncts on table A, table B, and/or table C. More specifically, the brackets around "LEFT OUTER" indicate that the "LEFT OUTER" instruction may be specified, but that it may be omitted.

As is understood in the art, a "JOIN" operation, e.g., "A JOIN B ON <predicates B> JOIN C ON <predicates C>," combined with a "WHERE" clause, "WHERE <predicates WHERE>," produces all combinations of records (record$_1$, record$_2$, record-$_3$), such that record$_1$ is a record of table A, record$_2$ is a record of table B, and record$_3$ is a record of table C, and all Boolean predicates <predicates B>, <predicates C>, and <predicates WHERE> are satisfied. When specified for table B, the "LEFT OUTER JOIN" operation will produce a row for table A and table C regardless of whether there are rows in table B that satisfy "<predicates B>". As understood in the art, when specified for table C, the "LEFT OUTER JOIN" operation will produce a row for table A and table B regardless of whether there are rows in table C that satisfy "<predicates C>".

Normally, one customer and/or internal system issuing this a single query with a "JOIN" operation may not detract from the resources (e.g., available memory, available network bandwidth, available read/seek times, available processing cycles, etc.) of the datacenter. However, where a datacenter services thousands of customers, which may themselves serve thousands of clients, the resources of the datacenter quickly vanish when hundreds or thousands of these JOIN queries are being received and performed.

SUMMARY

To address these and other problems, this disclosure provides for apparatus for conducting a hierarchical join on a hierarchically clustered data stream. In one aspect, the apparatus may include a memory configured to store a query condition that determines whether a Structured Query Language query is suitable for performing a non-buffering read operation on a hierarchical data storage, and a processor in communication with the memory, the processor being configured to receive a Structured Query Language ("SQL") query and evaluate the SQL query for the query condition. The processor may also be configured to transform the SQL query into a read operation query for the hierarchical data storage. Furthermore, when the SQL query satisfies the query condition, the processor may be configured to perform a non-buffering read operation on the hierarchical data storage based on the read operation query, wherein the non-buffering read operation results in a hierarchically clustered data stream, evaluate the hierarchically clustered data stream according to at least one predicate of the SQL query to obtain a plurality of record results, and transmit the plurality of record results to a client device.

In another aspect of the apparatus, the query condition establishes that the SQL query is valid for performing the non-buffering read operation when a plurality of tables identified in the SQL query are top-down hierarchical.

In a further aspect of the apparatus, the processor is configured to evaluate the SQL query for the query condition by evaluating a database schema for the hierarchical data storage.

In yet another aspect of the apparatus, the query condition specifies that the plurality of tables identified in the SQL query are top-down hierarchical when each table of the plurality of tables is only a proper ancestor or a proper descendant of another table in the plurality of tables.

In yet a further aspect of the apparatus, the query condition is not satisfied when a first table of the plurality of tables has a hierarchical relationship with a second table of the plurality of tables other than being a proper ancestor or being a proper descendant.

In another aspect of the apparatus, the query condition establishes that the SQL query is valid for performing the non-buffering read operation when the at least one predicate of the SQL query specifies that, when a record of a first table is to be joined to records of a second table, the records of the second table are descendants of the record of the first table and the record of the first table is not joined to the records of the second table that are not descendants of the record of the first table.

In a further aspect of the apparatus, the processor is configured to evaluate the SQL query for the query condition by confirming that a prefix of a primary key value of at least one record of the records of the second table comprises a primary key value of the record of the first table.

In yet another aspect of the apparatus, the query condition establishes that the SQL query is valid for performing the non-buffering read operation when the SQL query comprises only one operation type following a first instance of the operation type.

In yet a further aspect of the apparatus, the operation type comprises a SQL "LEFT OUTER JOIN" operation type.

In another aspect of the apparatus, processor is further configured to evaluate the SQL query for the query condition by determining whether, after an instance of a "LEFT OUTER JOIN" operation type in the SQL query, no other variations of a SQL "JOIN" operation appear other than the "LEFT OUTER JOIN" operation type.

In a further aspect of the apparatus, the query condition establishes that the SQL query is valid for performing the non-buffering read operation when a first join condition on an ancestor table is not met, a second join condition on a descendant table is also not met.

In yet another aspect of the apparatus, the processor is configured to evaluate the SQL query for the query condition by determining that the at least one predicate comprises a conjunct of the form "X.A=Y.B," where: X is a first table, A is a first column of the first table, Y is a second table, and B is a second column of the second table.

This disclosure also provides for a method for conducting a hierarchical join on a hierarchically clustered data stream. The method may include storing, in a computer-readable memory, a query condition that determines whether a Structured Query Language query is suitable for performing a non-buffering read operation on a hierarchical data storage and receiving, with a processor in communication with the computer-readable memory, a Structured Query Language ("SQL") query. The method may also include valuating the SQL query for the query condition, transforming the SQL query into a read operation query for the hierarchical data storage, and when the SQL query satisfies the query condition, performing a non-buffering read operation on the hierarchical data storage based on the read operation query, wherein the non-buffering read operation results in a hierarchically clustered data stream, evaluating the hierarchically clustered data stream according to at least one predicate of the SQL query to obtain a plurality of record results, and transmitting the plurality of record results to a client device.

In another aspect of the method, the query condition establishes that the SQL query is valid for performing the non-buffering read operation when a plurality of tables identified in the SQL query are top-down hierarchical.

In a further aspect of the method, evaluating the SQL query for the query condition comprises evaluating a database schema for the hierarchical data storage.

In yet another aspect of the method, the query condition specifies that the plurality of tables identified in the SQL query are top-down hierarchical when each table of the plurality of tables is only a proper ancestor or a proper descendant of another table in the plurality of tables.

In yet a further aspect of the method, the query condition is not satisfied when a first table of the plurality of tables has a hierarchical relationship with a second table of the plurality of tables other than being a proper ancestor or being a proper descendant.

In another aspect of the method, the query condition establishes that the SQL query is valid for performing the non-buffering read operation when the at least one predicate of the SQL query specifies that, when a record of a first table is to be joined to records of a second table, the records of the second table are descendants of the record of the first table, and the record of the first table is not joined to the records of the second table that are not descendants of the record of the first table.

In a further aspect of the method, evaluating the SQL query for the query condition comprises confirming that a prefix of a primary key value of at least one record of the records of the second table comprises a primary key value of the record of the first table.

In yet another aspect of the method, the query condition establishes that the SQL query is valid for performing the non-buffering read operation when the SQL query comprises only one operation type following a first instance of the operation type.

In yet a further aspect of the method, the operation type comprises a SQL "LEFT OUTER JOIN" operation type.

In another aspect of the method, evaluating the SQL query for the query condition comprises determining whether, after an instance of a "LEFT OUTER JOIN" operation type in the SQL query, no other variations of a SQL "JOIN" operation appear other than the "LEFT OUTER JOIN" operation type.

In a further aspect of the method, the query condition establishes that the SQL query is valid for performing the non-buffering read operation when a first join condition on an ancestor table is not met, a second join condition on a descendant table is also not met.

In yet another aspect of the method, evaluating the SQL query for the query condition by determining that the at least one predicate comprises a conjunct of the form "X.A=Y.B," where: X is a first table, A is a first column of the first table, Y is a second table, and B is a second column of the second table.

This disclosure further provides for a computer-readable medium having computer-readable instructions stored thereon that, when executed by a processor, cause a processor to perform a method, the method comprising storing, in a computer-readable memory, a query condition that determines whether a Structured Query Language query is suitable for performing a non-buffering read operation on a hierarchical data storage, and receiving, with a processor in communication with the computer-readable memory, a Structured Query Language ("SQL") query. The method may also include evaluating the SQL query for the query condition, transforming the SQL query into a read operation query for the hierarchical data storage, and when the SQL query satisfies the query condition, performing a non-buffering read operation on the hierarchical data storage based on the read operation query, wherein the non-buffering read operation results in a hierarchically clustered data stream. The method may also include evaluating the hierarchically clustered data stream according to at least one predicate of the SQL query to obtain a plurality of record results, and transmitting the plurality of record results to a client device.

In another aspect of the computer-readable medium, the query condition establishes that the SQL query is valid for performing the non-buffering read operation when a plurality of tables identified in the SQL query are top-down hierarchical.

In a further aspect of the computer-readable medium, evaluating the SQL query for the query condition comprises evaluating a database schema for the hierarchical data storage.

In yet another aspect of the computer-readable medium, the query condition specifies that the plurality of tables identified in the SQL query are top-down hierarchical when each table of the plurality of tables is only a proper ancestor or a proper descendant of another table in the plurality of tables.

In yet a further aspect of the computer-readable medium, the query condition is not satisfied when a first table of the plurality of tables has a hierarchical relationship with a second table of the plurality of tables other than being a proper ancestor or being a proper descendant.

In another aspect of the computer-readable medium, the query condition establishes that the SQL query is valid for performing the non-buffering read operation when the at least one predicate of the SQL query specifies that, when a record of a first table is to be joined to records of a second table, the records of the second table are descendants of the record of the first table, and the record of the first table is not joined to the records of the second table that are not descendants of the record of the first table.

In a further aspect of the computer-readable medium, evaluating the SQL query for the query condition comprises confirming that a prefix of a primary key value of at least one record of the records of the second table comprises a primary key value of the record of the first table.

In yet another aspect of the computer-readable medium, the query condition establishes that the SQL query is valid for performing the non-buffering read operation when the SQL query comprises only one operation type following a first instance of the operation type.

In yet a further aspect of the computer-readable medium, the operation type comprises a SQL "LEFT OUTER JOIN" operation type.

In another aspect of the computer-readable medium, evaluating the SQL query for the query condition comprises determining whether, after an instance of a "LEFT OUTER JOIN" operation type in the SQL query, no other variations of a SQL "JOIN" operation appear other than the "LEFT OUTER JOIN" operation type.

In a further aspect of the computer-readable medium, the query condition establishes that the SQL query is valid for performing the non-buffering read operation when a first join condition on an ancestor table is not met, a second join condition on a descendant table is also not met.

In yet another aspect of the computer-readable medium, evaluating the SQL query for the query condition by determining that the at least one predicate comprises a conjunct of the form "X.A=Y.B," where: X is a first table, A is a first column of the first table, Y is a second table, and B is a second column of the second table.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present disclosure relates to a relational interface system that facilitates communications between one or more client devices and one or more hierarchical data storages. In particular, this disclosure provides for a relational system that may accept various Structured Query Language ("SQL") queries from a client device, evaluate whether the one or more SQL queries conform to one or more predefined query conditions, and then perform a non-buffering read operation from the one or more hierarchical data storages based on the evaluation. The non-buffering read operation provides an efficient manner in which the relational system may read a hierarchically clustered data stream from the one or more hierarchical data storages.

The relational interface system represents an advancement over current technologies for accessing hierarchically organized data storages because the non-buffering read operation may be performed once on the one or more hierarchically organized data storages such that the relational interface system need not make multiple read requests of the same data storage. Moreover, the non-buffering read operation may be achieved with a fixed bound to the amount of buffering. In addition, the described systems and methods also reduce the elapsed time between the time a request is sent from the client device to the system, until the time the client device has received the response to its request.

In this manner, the non-buffering read operation significantly reduces the amount of resources (e.g., processor cycles, seek/read times, random-access memory, etc.) needed in order to retrieve and join multiple database tables when one or more SQL queries are received, such as SQL queries having the "JOIN" operation, the "LEFT OUTER JOIN" operation, and other such operations.

Figure 1:
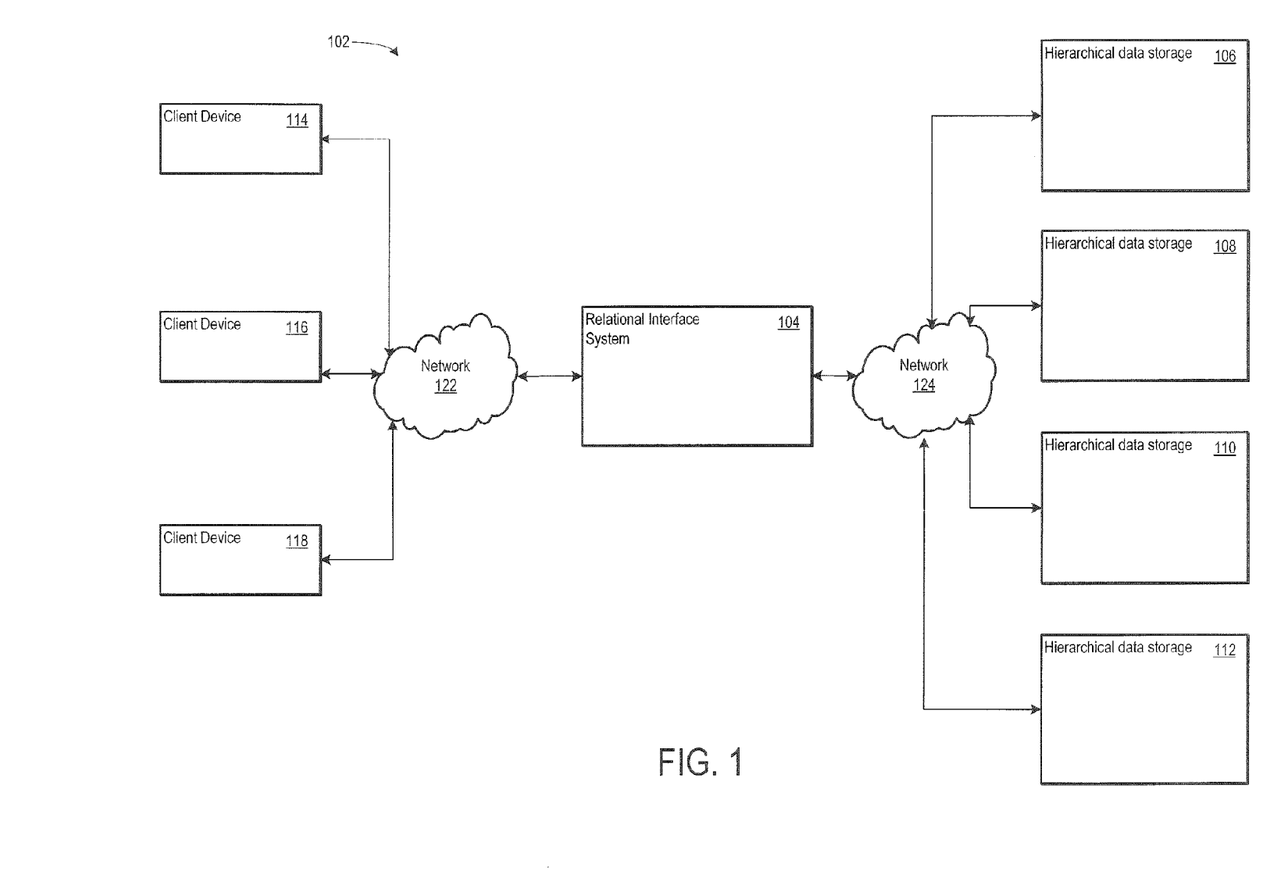
FIG. 1 illustrates an example of a relational interface system in communication with client devices and one or more hierarchical data storages according to aspects of the disclosure.

FIG. 1 illustrates an example of a datacenter environment 102 where the relational interface system 104 is in communication with one or more client devices 114-118 and one or more hierarchical data storages 106-112. The relational interface system 104 may provide one or more interfaces to the client devices 114-118 for accessing the one or more hierarchical data storages 106-112. The interface provided to the client devices 114-118 may be a graphical user interface, a command line interface, or a combination of the two. The interface may also include an Application Programming Interface ("API") that facilitates the programmatic running of one or more received SQL queries, such as through a Remote Procedure Call ("RPC") system. Moreover, the interface provided to the client devices 114-118 may be an interface developed using one or more Internet-related technologies, such as the Hypertext Markup Language ("HTML"), JavaScript, the Extensible Markup Language ("XML"), Cascading Style Sheets ("CSS"), or any other such technologies.

The interface may be configured to receive one or more queries from the client devices 114-118 for accessing the hierarchical data storages 106-112. The queries may be formatted according to Standard SQL or any other query language for accessing or managing data in a relational database management system ("RDBMS"). Examples of queries that may be provided by the client devices 114-118 include queries that include "SELECT" operations, "JOIN" operations, variations of the "JOIN" operation (e.g., "INNER JOIN,"

"LEFT OUTER JOIN," "NATURAL JOIN," etc.), "UNION" operations, or any other operations of Standard SQL.

Furthermore, the objection-relational interface system 104 may be configured to translate one or more SQL queries into a query understandable by the hierarchical data storages 106-112. For example, the hierarchical data storages 106-112 may be implemented on a server or other device that does not understand SQL queries. In this regard, the relational interface 104 may be configured to interpret the SQL queries received from one or more client devices 114-118, translate the SQL queries into a query understandable by the data storages 106-112, receive one or more data streams from the data storages 106-112 based on the initial SQL query, and then provide results to the client devices 114-118 based on the received data streams.

Although systems and methods disclosed herein are not limited by any particular data structure, the data storages 106-112 may be implemented in computer registers, as one or more object databases having one or more entities that define a plurality of different fields and records, one or more relational databases defined by one or more tables having a plurality of different fields and records, Extensible Markup Language ("XML") documents, flat files, a multi-dimensional array (e.g., a 1-dimensional array, a 2-dimensional array, etc.), or combinations thereof. The data storages 106-112 may also be formatted in any computer-readable format. In addition, the data storages 106-112 may comprise any information sufficient to identify the relevant information, such as numbers, descriptive text, proprietary codes, references to data stored in other areas of the same memory or different memories (including other network locations) or information that is used by an application to calculate and/or store the relevant data.

A record of one or more of the data storages 106-112 may have one or more attributes. The attributes may store information about the record. Depending on the information stored in the hierarchical data storages 106-112, the attributes may define such things as employee information (where the records relate to employees), advertising campaign information (where the records relate to advertising campaigns), advertisement keywords information (where the records relate to advertisement keywords), and other such information.

The attributes of each record may further include a primary key attribute and one or more foreign key attributes. The primary key attribute of the record may store a primary key value that uniquely identifies the record. In one implementation, multiple attributes of a given record may be constructed to form the primary key value that uniquely identifies the given record. The one or more foreign key attributes may each store a foreign key value that identifies another record. Furthermore, to associate a child record with its parent record, the primary key value of the child record may incorporate parts of the primary key value of the parent record. In one implementation, the primary key value of the child record may include the primary key value of the parent record as a prefix. In another implementation, the parent record may have one or more N primary key attributes, the child record may have M primary key attributes (where M is greater than or equal to N), and the first N values from the M primary key attributes of the child record may correspond to the primary key attributes of the parent record.

For example, where the primary key value of the parent record is "325," and the primary key value of the child record is "478," a new primary key value may be established for the child record such as "325,478" or "325:478" where the primary key value of the parent record has been prepended to the primary key value of the child record. In this manner, the objection-relational interface system 104 may readily identify parent/child relationships when a data stream is being received from one or more of the hierarchical data storages 106-112.

The relational interface system 104 may communicate with one or more client devices 114-118 via a network 122, and the relational interface system 104 may communicate with one or more hierarchical data storages 106-112 via a network 124. The networks 122-124 may include one or more types of communication channels including Ethernet, Universal Serial Bus ("USB"), Small Computer System Interface ("SCSI"), combinations of the foregoing and other such wired communication channels. The networks 122-124 may also include wireless communication channels such as Bluetooth (e.g., wireless communication channels operating in the 2400-2480 MHz band), the variations of IEEE 802.11 (e.g., IEEE 802.11a, IEEE 802.11b, etc.), Worldwide Interoperability for Microwave Access ("WiMAX"), and other such wireless technologies (e.g., any wireless technology operating in the industrial, scientific, and medical ("ISM") radio bands).

The networks 122-124 may also include various types of networks. As examples, the networks 122-124 may include a Wide Area Network ("WAN"), such as the Internet, a Local Area Network ("LAN"), a Personal Area Network ("PAN"), or a combination of WANs, LANs, and PANs. The network 122 may also include the network 124 and vice versa.

The client devices 114-118 may be any type of client device or system configured to provide one or more SQL queries to the relational interface system 104. For example, the client devices 114-118 may include a desktop computer, a mobile device, such as a laptop, a smartphone, a Personal Display Assistant ("PDA"), a tablet computer, or other such mobile device. The client devices 114-118 may also include other systems, such as provisioning systems, telecommunication systems, datacenter systems, and other such system. Any one of the client devices 114-118 may be configured to communicate with the relational interface system 104 via an interface provided by the relational interface system 104. Moreover, the relational interface system 104 may be configured to provide record results to the one or more client devices 114-118 based on the SQL queries provided by the one or more client devices 114-118.

Figure 2:
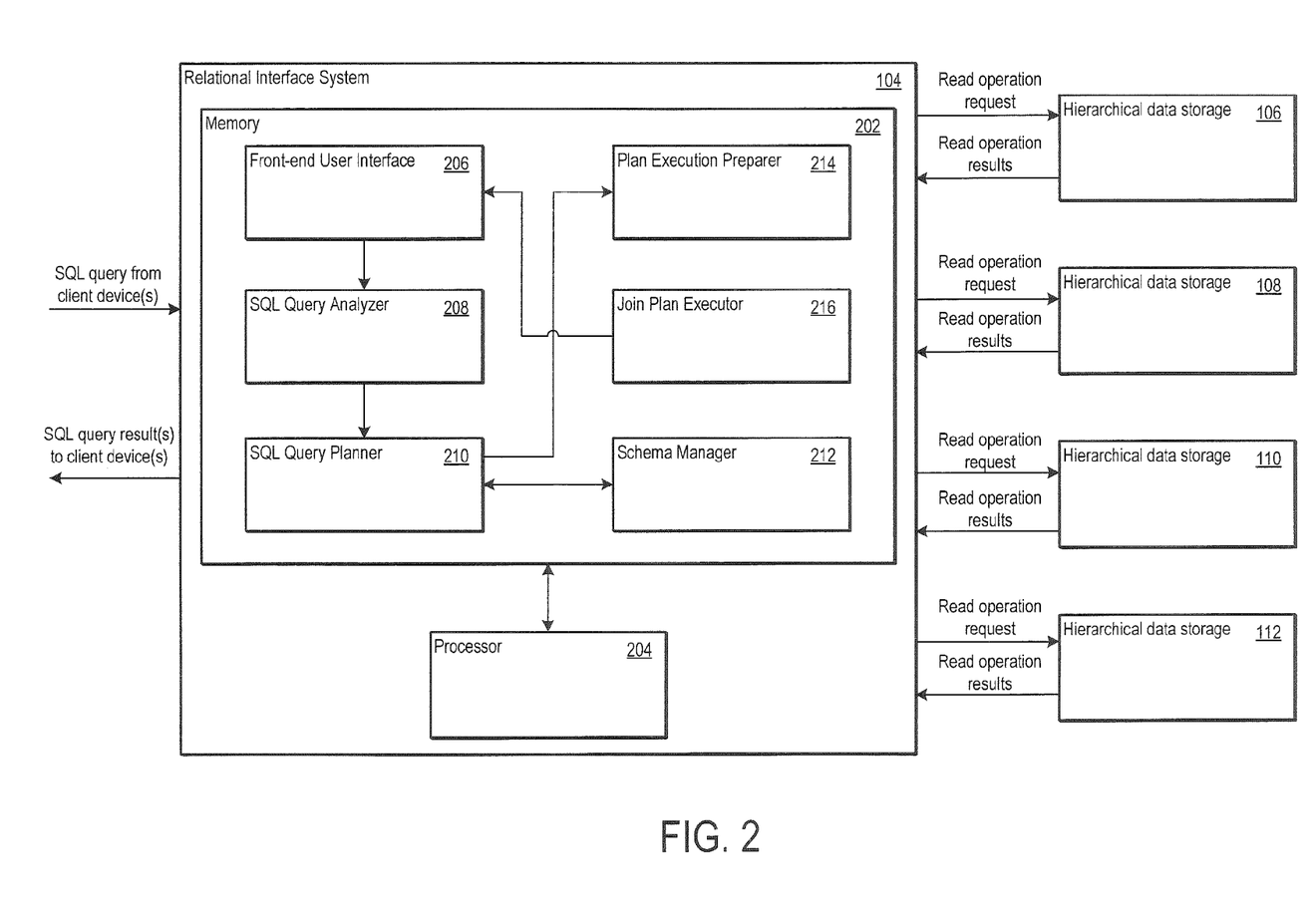
FIG. 2 illustrates an example of the relational interface system of FIG. 1 according to aspects of the disclosure.

FIG. 2 illustrates one example of the relational interface system 104 shown in FIG. 1 and according to aspects of the disclosure. As shown in FIG. 2, the relational interface system 104 may include a memory 202 in communication with a processor 204. The relational interface system 104 may instantiate and/or store any number of applications in the memory 202, such as a front-end user interface 206, a SQL query analyzer 208, a SQL query planner 210, a schema manager 212, a plan execution preparer 214, and a join plan executor 216

The processor 204 may be any conventional processor or microprocessor, such as a central processing unit ("CPU"), or a dedicated device such as an application-specific integrated circuit ("ASIC").

Although FIG. 2 functionally illustrates the processor 204, the memory 202, and other elements of the relational interface system 104 as being within the same block, it will be understood by those of ordinary skill in the art that the processor 204 and the memory 202 may actually comprise multiple processors and memories that may or may not be stored within the same physical housing. For example, the memory 204 may be a hard drive or other storage media located in a housing different from that of the relational interface system 104. Accordingly, references to one or more processors, one or memories, the relational interface system 104, or a computer will be understood to include references to a collection of processors or computers or memories that may or may not operate in parallel. Rather than using a single processor to perform the operations described herein, some of the components may each have their own processor that performs operations related to the component's specific function.

The memory 202 may be of any type of memory configured to store information accessible by the processor 204, including a computer-readable medium, or other medium that stores data that may be read with the aid of an electronic device, such as a hard-drive, memory card, read-only memory ("ROM"), random-access memory ("RAM"), an electrically erasable programmable read-only memory ("EEPROM"), one or more a digital video disc ("DVD") or other optical disks, as well as other write-capable and read-only memories. Systems and methods may include different combinations of the foregoing, whereby different portions of the software functionalities of the relational interface system 104 are stored on different types of media.

The memory 202 may include any set of computer-executable instructions to be executed directly (such as machine code) or indirectly (such as scripts) by the processor 204. For example, the computer-executable instructions may be stored as computer code on a computer-readable medium. In that regard, the terms "instructions," "programs," and "applications" may be used interchangeably herein. The instructions may be stored in object code format for direct processing by the processor 204, or in any other computer language including scripts or collections of independent source code modules that are interpreted on demand or compiled in advance. Functions, methods and routines of these instructions are explained in more detail below.

In various examples described herein, the processor 204 may be located remote from the relational interface system 104 and may communicate with one or more components and/or applications, such as the memory 202 and/or components 206-216, wirelessly over a network (e.g., a local area network, a wide area network, etc.). In addition, one or more of the components 206-216 may be housed or implemented within other servers or computers, and the relational interface system 104 may receive information from those components 206-216. For example, the components 206-216 may be stored in another server or computer and the processor 204 may receive information from each of these other servers and/or computers. In other aspects, some of the processes described herein are executed on a processor disposed within the relational interface system 104 and others by a remote processor housed within a server being monitored, including performing operations for determining whether a SQL query is a valid query for performing a non-buffering read operation or for processing a hierarchically clustered data stream.

The relational interface system 104 may implement a front-end user interface 206 for communicating with one or more of the client devices 114-118. The front-end user interface 206 may be configured to display a graphical user interface, a command line interface, or combinations of the two. The front-end user interface 206 may also implement an API that may be accessed by the one or more client devices 114-118 for communicating with one or more of the hierarchical data storages 106-112, or combinations thereof. Moreover, the front-end user interface 206 may be configured to accept a SQL query as discussed previously. In addition, the front-end user interface 206 may be configured to display or transmit data as a result of the SQL query, such as the records that result from a SQL query that includes a "JOIN" operation.

When the front-end user interface 206 receives a SQL query, the front-end user interface 206 may communicate the SQL query to the SQL query analyzer 208. The SQL query analyzer 208 may be configured to parse the received SQL query into its various components. For example, the SQL query analyzer 208 may deconstruct the predicates of a SQL JOIN query, and store the deconstructed predicates as filter predicates to be applied when the hierarchically clustered data stream is received from the hierarchical data storages 106-112. For example, where the SQL query analyzer 208 receives a SQL query of "SELECT * FROM $Table_1$ JOIN Tablet ON $Table_1.column_1=Table_2.column_2$ JOIN $Table_3$ ON $Table_2.column_2=Table_3.column_3$", the SQL query analyzer 208 may deconstruct the predicates into a first predicate of "$Table_1.column_1=Table_2.column_2$" and a second predicate of "$Table_2.column_2=Table_3.column_3$". These two predicates may then be used as filter predicates to determine whether the records within the received hierarchically clustered data stream should be produced as output and/or transmitted to one or more of the client devices 114-118.

In deconstructing the predicates, the SQL query analyzer 208 may separate those predicates that are involved in "LEFT OUTER JOIN" operations and those predicates that are involved in non-"LEFT OUTER JOIN" operations. For example, the SQL query analyzer 208 may store together all predicates from "ON" clauses for tables that are not involved in "LEFT OUTER JOIN" operations along with all predicates from any "WHERE" clauses of such operations. Furthermore, the predicates from the "ON" clauses of each table that participates in a "LEFT OUTER JOIN" operation may each be stored in a separate location, where each location corresponds to a particular table participating in the "LEFT OUTER JOIN" operation.

Further still, the SQL query analyzer 208 may deconstruct the predicates into its conjuncts. A predicate may be considered a conjunct when it involves a single operation, such as "A.X=B.Y" or "A.X=Z". In the foregoing example, the two conjuncts above may coincidentally include "$Table_1.column_1=Table_2.column_2$" and "$Table_2.column_1=Table_3.column_3$". Of course, there may be instances where a complex predicate may be deconstructed into several conjuncts. As explained below, the relational interface system 104 may leverage the conjuncts of a SQL query to determine whether the SQL query is suitable as a query for a non-buffering read operation on the hierarchical data storages 106-112.

A minor departure from FIG. 2 to explain the term "non-buffering read operation" may assist the reader in understanding the advancement of the systems and methods disclosed herein. As is understood in the art of database systems, a database residing on a server may not always have all the information needed to evaluate a given SQL query. In many instances, different database tables from a database may be stored on different servers, which may be needed to evaluate the given SQL query. As a relational database may be implemented without regard to the hierarchical ordering of the data stored therein, a server evaluating the given SQL query may have to send multiple read requests to this database in order to collect sufficient information from the disparate tables in order to evaluate the received SQL query. When the evaluating server (i.e., the server evaluating the SQL query) receives the requested information from these disparate tables, the evaluating server may then store the received information (i.e., "buffer" the received information) for evaluating the predicates of the SQL query once all the necessary information has been received. Even in a database that is not implemented as a relational database, such as an object-oriented database, there is little regard for whether the data stored within is hierarchically clustered.

In this context, the term "non-buffering" read operation signifies that the relational interface system 104 may evaluate the predicates of the received SQL query as the hierarchically clustered data stream of records from the hierarchical data storages 106-112 is being received. A hierarchically clustered data stream may be a data stream that contains a sequence of records from a hierarchically organized data store, where the data stream is ordered in such a way that each record is ordered after its parent record, and before any other record of its parent table.

More particularly, while there may be some buffering, the buffering may be limited to a single record from each table involved in the JOIN operation of the received SQL query. In addition, the relational interface system 104 may perform some buffering in the process of receiving the hierarchically clustered data stream from the one or more hierarchical data storages 106-112. In one implementation, a fixed upper bound on the amount of buffering may be established in the relational interface system 104, and the buffering performed by the relational interface system 104 may satisfy this fixed upper bound.

Moreover, the relational interface system 104 may ignore particular data being received from the hierarchical data storages 106-112 when the relational interface system 104 determines that the data to be ignored is not relevant to any result that would need to be produced of the JOIN operation. For example, the data to be ignored may include one or more records whose parent records were found to not satisfy the applicable predicates of the JOIN operation.

Furthermore, because the data stream being received is hierarchically clustered, the relational interface system 104 need not store an entire database table, or a part thereof that includes more than one record, before evaluating the records of the database table. Since the received data stream is hierarchically clustered, the relational interface system 104 knows when a given record is a parent record and when a set of records are child records related to that parent record. Thus, the non-buffering aspect of the read operation is an advancement over the current state of the art since the relational interface system 104 need only request the records to evaluate the received SQL query once, and may only need to store a minimal set of records in order to evaluate the predicates of the received SQL query in performing the JOIN operations of the received SQL query.

The next two components of the relational interface system 104 that process the SQL query include the SQL query planner 210 and the plan execution preparer 214. These two components may leverage a set of query conditions that establish when the received SQL query may be valid for the relational interface system 104 to perform the non-buffering read operation. The relational interface system 104 may be configured such that if any one of the query conditions is not satisfied, the relational interface 104 does not perform the non-buffering read operation. In another configuration, the relational interface system 104 may be configured such that the relational interface system 104 performs the non-buffering read operation even if one query condition is not satisfied. Permutations of the foregoing configurations are also possible.

The SQL query planner 210 may be configured to determine whether the received SQL query satisfies one or more query conditions. A first query condition may establish that the SQL query is valid for performing the non-buffering read operation when the tables identified in the SQL query are top-down hierarchical. More particularly, this first query condition may specify that the SQL query is a valid query when the SQL query invokes the "JOIN" operation and the tables participating in the "JOIN" operation are top-down hierarchical. The tables of the SQL query may be considered top-down hierarchical when, for every table X participating in the join operation, each other table Y participating in the join operation is either a proper ancestor or a proper descendant of the table X in the table hierarchy, all other hierarchical relationships being excluded.

For example, suppose that the "JOIN" operation involves database tables A, B, C, and D, where A is the parent, or root, of the hierarchy, B and D are children database tables of A, and C is a child database table of B. In this exemplary hierarchy, an SQL query having a "JOIN" operation of "A JOIN B JOIN C" may satisfy this first query condition, but an SQL query having a "JOIN" operation of "A JOIN B JOIN D" may not satisfy this first query condition, since tables B and D are considered siblings (i.e., B and D are neither proper ancestors of one another nor proper descendants).

To determine whether the tables participating in the SQL query are top-down hierarchical, the SQL query planner 210 may communicate with a schema manager 212. The schema manager 212 may store one or more database schemas for the hierarchical data storages 106-112. The SQL query planner 210 may request a database schema for one or more of the data storages 106-112, and then compare the tables and columns in appearing in the received database schema(s) with the tables appearing in the received SQL query. In this manner, the SQL query planner 210 need not actually retrieve data from the data storages 106-112, but may leverage the schema manager 212 for this information.

In one implementation, the SQL query planner 210 may alter the arrangement of the operations in the received SQL query. For example, after verifying that the first condition (e.g., that the tables participating in the "JOIN" operations are top-down hierarchical), the SQL query planner 210 may reorder the "JOIN" operations such that each participating table is preceded by all its ancestors and succeeded by all its descendants A second query condition that the SQL query planner 210 may evaluate involves the predicates of the received SQL query. More particularly, the second query condition may specify that a SQL query is valid for performing a non-buffering read operation when at least one predicate of the SQL query specifies that, when a record of a first table is to be joined to records of a second table, the records of the second table are descendants of the record of the first table, and the record of the first table is not joined to the records of the second table that are not descendants of the record of the first table.

In other words, this second query condition may define that the predicates specified in the "JOIN" or in the accompanying "WHERE" or "ON" clause must be such that if there is a table X and a table Y, and table X is a proper ancestor of table Y, then the predicates guarantee that each record of the table X is only joined to table Y records that are descendants of that table X record in the data set, and not to table Y records that are descendants of any other table X record. The focus of this second query condition is to ensure that the table Y records of a table X record are only being joined with that table X record, and not with any other table X record.

The SQL query planner 210 may also verify whether the received SQL query satisfies this second condition by communicating with the schema manager 212. In one example, the SQL query planner 210 may request one or more database schemas from the schema manager 212 to evaluate the received SQL query using the hierarchical primary and foreign keys of the database storages 106-112. As discussed previously, in one implementation, when a table Y record is a proper descendant of a table X record, the primary key attribute of the table Y record may have the primary key value of the table X record as a prefix. In another implementation, where multiple attributes together form the primary key of the table X record (i.e., the parent record), the primary key of the table Y record (i.e., the child record) may have attributes that correspond to the primary key its parent table, plus optionally one or more additional attributes.

Using the received one or more database schemas, the SQL query planner 210 may also compare the predicates of the received SQL query to confirm that at least one predicate of a "JOIN" operation includes a predicate equivalent to "X.K=Y.K", for all primary key attributes of the table X records. In other words, the SQL query planner 210 may determine that, when a predicate specifies "X.K=Y.K," that the value of the X.K field is a prefix to the value of the Y.K field.

Another query condition may specify that the received SQL query only contain a specific operation type following a first instance of that operation type. More particularly, this third query condition may specify that after an instance of a "LEFT OUTER JOIN" operation type in the received SQL query, no other variations of a SQL "JOIN" operation appear other than the "LEFT OUTER JOIN" operation type.

The SQL query planner 210 may verify whether the received SQL query satisfies this third condition by identifying the operations of the received SQL query, and then determining whether any other "JOIN" operations other than "LEFT OUTER JOIN" operations appear after a first "LEFT OUTER JOIN" operation. With this query condition, should a "JOIN" operation other than a "LEFT OUTER JOIN" operation appear after a first "LEFT OUTER JOIN" operation, the SQL query planner 210 may deconstruct the received SQL query into separate operations: operations that invoke the "LEFT OUTER JOIN" operation, and any other remaining operations. More particularly, the deconstructed operations may include all operations up to, and including, the first "LEFT OUTER JOIN" operation of the received SQL query and also including each subsequent "LEFT OUTER JOIN" operation up to, but not including, the next subsequent "JOIN" operation that is not a "LEFT OUTER JOIN" operation, and any remaining operations.

Finally, a fourth query condition may specify that a SQL query is valid for performing a non-buffering read operation when, for each table Y record that participates in the "JOIN" operation of the SQL query and that is a proper descendant of a table X record, the predicates in the "ON" clause for that "JOIN" operation (e.g., "LEFT OUTER JOIN Y ON <predicates>") may ensure that whenever the predicates on table X records are not met, the predicates on table Y records are also not met. This fourth query condition may further apply where the table X and table Y participate in an "LEFT OUTER JOIN" operation, table X and table Y are being directly joined together, and there is no other table between table X and table Y in the totality of the JOIN operation.

The SQL query planner 210 may verify whether the received SQL query satisfies this fourth query condition by confirming that the predicates contain a conjunct of the form "X.A=Y.B" (or its reverse), where "X.A" is a reference to a field value of the table X record, and "Y.B" is a reference to a field value of the table Y record. This fourth condition establishes a cascading behavior in the evaluation of the received SQL query, such that the absence of a matching record for table X implies the absence of a matching record for a descendant table Y of table X.

When evaluating the predicate clauses of the "JOIN" operations of the received SQL query, the SQL query analyzer 208 and/or the SQL query planner 210 may arrange all "INNER JOIN" predicates in the received SQL query together in a single set of predicates, along with any "WHERE" clause predicates. More particularly, when the SQL query planner 210 is evaluating a SQL query that includes a "JOIN" operation of the form "X JOIN Y", all predicates that may be evaluated against the available tables X and Y may be considered "JOIN" predicates, even when these predicates occur in the "ON" clauses of later "JOIN" operations, or when these predicates occur in the "WHERE" clauses, if any, of the received SQL query. Although the foregoing example illustrates two tables participating in the "JOIN" operation, it is also possible that more than two tables participate in the "JOIN" operation and that all predicates that can be evaluated against these tables are considered "JOIN" predicates.

In addition, the SQL query planner 210 may further substitute field references in predicates of the received SQL query by equivalent field references from other tables so that the predicates can be applied. For example, where there are predicates "X.A=Z.B" and "Z.B=Y.C," then the SQL query planner 210 may substitute the "Y.C" field reference for the "Z.B" field reference in the first predicate to yield "X.A=Y.C", which is a predicate that may be applied to the "JOIN" operation "X JOIN Y" since this "JOIN" operation references only fields from table X and table Y. The query planner 210 may include, in its evaluation, all predicates that are transformed according to the foregoing, even though the transformed predicates may not have been specified as such in the received SQL query.

The SQL query planner 210 may then turn further processing of the received SQL query over to the plan execution preparer 214. Of course, it is also possible that the plan execution preparer 214 evaluates the received SQL query simultaneously, or substantially simultaneously, as the SQL query planner 210. The plan execution preparer 214 may be configured to transform the received SQL query into a read operation understandable by the hierarchical data storages 106-112.

In one example, the plan execution preparer 214 may transform the received SQL query into a read operation by identifying the primary key value of the first record appearing in a highest-level table participating in the SQL query (i.e., the table at, or closest to, the root level), and identifying the primary key value of the last record appearing in the highest-level table participating in the SQL query. The plan execution preparer 214 may specify one or more sentinel values that identify the beginning and ending records for the read operation. A sentinel value may be a special value that is not within the allowed range of values for a record attribute, which may be used to indicate a special meaning, such as indicating the lowest possible value, or the highest possible value. The primary key value of the first record may indicate where a hierarchical data storage should start reading, and the primary key value of the second record may indicate that the hierarchical data storage should stop reading after that record.

In another example, the plan execution preparer 214 may formulate a read operation command that involves each of the tables participating in the "JOIN" operations of the received SQL query. The read operation command may specify a starting sentinel value of a first record of a participating table, and an ending sentinel value of a last record of a participating table. In this manner, the read operation may specifically instruct which records the hierarchical data storages 106-112 should retrieve. Regardless of the manner in which the read operation is constructed, because the hierarchical data storages store records in a hierarchically clustered arrangement, every descendant record between a starting record of the highest-level table participating in the SQL query and the ending record of the highest-level table participating in the SQL query may be read and communicated to the relational interface system 104.

As the relational interface system 104 is receiving the hierarchically clustered data stream from the one or more hierarchical data storages 106-112, the join plan executor 216 may be configured to evaluate the records of the received data stream against the predicates of the received SQL query. The join plan executor 216 may perform various operations on the received hierarchically clustered data stream in order to perform this evaluation.

In one set of operations, the join plan executor 216 may decode the hierarchically clustered data stream into one or more record combinations. A record combination may be a combination of records such that the combinations contains, at most, one record for each table participating in the one or more "JOIN" operations of the received SQL query. These initial decoding operations may determine the record combinations to be evaluated against the predicates of the received SQL query. A record combination may be evaluated against the predicates of the received SQL query when the record combination is considered a complete record combination. A record combination may be considered a complete record combination when there are no other child records for the lowest record (e.g., the record that is deepest in the hierarchy) in the record combination. The join plan executor 216 may also evaluate predicates on incomplete record combinations, as long as the records present in the record combination support the evaluations of these predicates. In one implementation, evaluating the predicates on incomplete record combinations may assist in determining determine whether the join plan executor 216 can ignore the next batch of child records that the join plan executor 216 will receive from one or more of the data storages 106-112.

In performing these decoding operations, the join plan executor 216 may establish the record combinations to evaluate by maintaining a "current record combination", which may include the last non-discarded, non-ignored record read from the hierarchical data storages 106-112. As discussed below, a record may be discarded or ignored when the record added to the "current record combination" causes a conjunct (derived earlier from the deconstruction of the predicates by the SQL query analyzer 208) to not be satisfied.

The "current record combination" may also include ancestor records for the non-discarded, non-ignored record in the hierarchy. The join plan executor 216 may also establish memory for expected descendant records of the last non-discarded, non-ignored record, where that memory may be set to a NULL value. In one example, the join plan executor 216 may establish an array (one-dimensional, multi-dimensional, etc.) for storing the "current record combination," where each array element in the array corresponds to a current record from a particular table. It is possible that some of the cells of the array store the NULL value.

During this decoding operation, the "current record combination" may not necessarily be a record combination to produce as a match, where a match signifies that the record combination satisfies the predicates of the received SQL query. However, it is possible that a record in a "matching" record combination may be NULL when the corresponding table participates in an "LEFT OUTER JOIN" operation and if there is no record in the corresponding table that could be used as a replacement for NULL, where the resulting record combination would satisfy the predicates specified for the "LEFT OUTER JOIN" operation.

In one example, the join plan executor 216 may produce the current record combination when the join plan executor 216 determines that the current record combination is complete. A record combination may be determined as complete when there are no larger record combinations that include the current record combination as a prefix. If there are larger record combinations that would include the current record combination as a prefix, the join plan executor 216 may identify the larger record combinations for production rather than the smaller record combination.

For example, suppose that the received hierarchically clustered data stream includes records A1, B1.3, C1.3.2, C1.3.3, B1.4, C1.4.2, A2, A3, B3.7, B3.8, C3.8.1, where letters indicate a table, a number indicates an individual record, and a period (".") indicates a child record. Thus, in this foregoing example, A1 is a record of table A, and B1.3, is a record of table B, but record A1 is an ancestor of record B1.3. Similarly, record C1.3.2 is a record of table C, and has a first ancestor of record B1.3 and has a second ancestor of record A1.

In this example, when the join plan executor 216 decodes the record A2, the join plan executor 216 may consider a record combination of "(A2)" to be "complete" since there is no child record B2.x to form a larger record combination of "(A2, B2.X)". In contrast, the join plan executor 216 may not consider a record combination of "(A3)" to be complete because the record combination of "(A3)" is a prefix of the record combination of "(A3, B3.7)".

However, not every record combination that is complete may be produced by the join plan executor 216 as a record result for the received SQL query. The analysis of determining "complete" record combinations may form one facet of the act of determining whether the current record combination is a record combination suitable for production (e.g., to the one or more client devices 114-118, for further processing, etc.). Other analysis operations may also occur, such as determining whether each table participating in the predicates of the received SQL query are present in the current record combination or determining whether there is a record in the record combination for each table participating in the "JOIN" operation that is not being joined using a "LEFT OUTER JOIN" operation. As discussed below, the evaluation of the predicates may occur substantially simultaneously as the operations for building the current record combination.

In some instance, determining whether the current record combination is complete may not be possible based on the current received record. In one implementation, the join plan executor 216 may determine whether the current record combination is complete after comparing the next received record with the current record combination. For example, the join plan executor 216 may determine that the current record combination "(A3, B3.7)" is complete when the next record arrives is B3.8 (thus forming a current record combination of "(A3, B3.8)" and not a record in the form of C3.7.X.

Thus in one implementation, the join plan executor 216 may first determine whether the current record combination is complete, such as by comparing the primary key value of the next received record with one or more primary key values of records of the current record combination, possibly produce the current record combination depending on whether the current record combination satisfies the predicates of the received SQL query, and then reading/decoding a new record from the hierarchical data storages 106-112 accordingly.

In another implementation, the join plan executor 216 may determine which table corresponds to the next received record to determine whether the current record combination is complete. Referring to the foregoing example of "A1, B1.3, C1.3.2, C1.3.3, B1.4, C1.4.2, A2, A3, B3.7, B3.8, C3.8.1," the join plan executor 216 may determine that the record combination "(A3, B3.7)" is complete based on the fact that the next record in the hierarchically clustered data stream must not be a C record. If the next received record is determined as a C record, then because of the ordering of the hierarchically clustered data stream, the join plan executor 216 expects the record to be of the form C3.7.X. Thus, should the join plan executor 216 receive any non-C record, it means that exists no C record exists of the form C3.7.X, since those records must be received after B3.7 but before any other B or A record.

While evaluating and collecting records from the hierarchically clustered data stream, the join plan executor 216 may also evaluate the conjuncts deconstructed by the SQL query analyzer 208. In one example, the join plan executor 216 may evaluate each of the conjuncts for the current record combination being maintained. The join plan executor 216 may evaluate each of the conjuncts when a record is added to the current record combination. When a conjunct is not satisfied, the join plan executor 216 may identify the record combination with the added record as a "mismatch." Thereafter, the join plan executor 216 may ignore and/or discard any record in the received hierarchically clustered data stream that is a child record of the added record that resulted in a mismatch (i.e., "the mismatched record"). Thus, the join plan executor 216 effectively skips over records that are hierarchically lower than the mismatched record. When the join plan executor 216 then reaches the next record in the hierarchy at the same level of the mismatched record or a record of an ancestor table of the table corresponding to the mismatched record, this next record may replace the mismatched record, and the join plan executor 216 then re-evaluates the conjuncts of the received SQL query.

The foregoing discussion regarding "mismatch"-based whole-subtree filtering is also applied for failing outer join conjuncts. The mismatch-based whole-subtree filter is applied for failing outer join conjuncts because the join plan executor 216 expects that an outer join operation have a cascading behavior.

The join plan executor 216 may establish the following semantics for outer join records (e.g., records for tables that were included in the "JOIN" operation by using a "LEFT OUTER JOIN" operation): Given a record combination "(A, B)," an outer join record combination of "(A, B, NULL)" should be produced when the third table is outer joined, and there were no records C such that the record combination "(A, B, C)" satisfied the outer join conditions of the join operation to the third table. If there is a record combination (A, B, C) for which the predicates from the ON clause of the LEFT OUTER JOIN to table C were true, but then conjuncts specified in the WHERE clause were false, no outer join record (A, B, NULL) is produced.

The join plan executor 216 may achieve these semantics by maintaining a highest table index (e.g., a number that corresponds to a table in the "JOIN" operation, numbered in increasing order starting from the first table) for which the join plan executor 216 found a record that satisfied the applicable join predicates. The join plan executor 216 may then perform the determination of producing an outer join record combination when all potential matching records for an outer joined table have been read. For instance, if the join plan executor 216 has identified a current record combination of (A, B, . . . ), the join plan executor 216 may decide whether to produce an outer join record when the join plan executor 216 receives a replacement for either the record A or the record B from the hierarchical data storages 106-112, indicating that the join plan executor 216 has read and/or decoded the entire sub-tree below record B.

The join plan executor 216 may then produce a record combination of "(A, B, NULL)" if the highest table index indicates that the join plan executor 216 did not find a record for the third table that matched the outer join conditions. In this record, when the record of "(A, B, NULL)" is produced by the join plan executor 216, the highest table index may also be NULL. This situation may occur when the highest table index is less than the table index of table C, indicating that no records of table C were found that satisfied the predicates of the received SQL query.

In this manner, the join plan executor 216 effectively performs a non-buffering read of the hierarchical data storages 106-112. As discussed previously, there may be instances where the join plan executor 216 determines to ignore or discard incoming records, such as those records that the join plan executor 216 knows would not satisfy a given conjunct. As the join plan executor 216 does not need to maintain a buffer of an entire table to determine whether any of the records of that table would satisfy one or more conjuncts, the join plan executor 216 may only set aside a smaller portion of memory in which to evaluate the records of the hierarchically clustered data stream. Thus, unlike database systems of the current state of the art, the join plan executor 216 requires much less overhead in order to evaluate JOIN operations of a SQL query.

Figure 3:
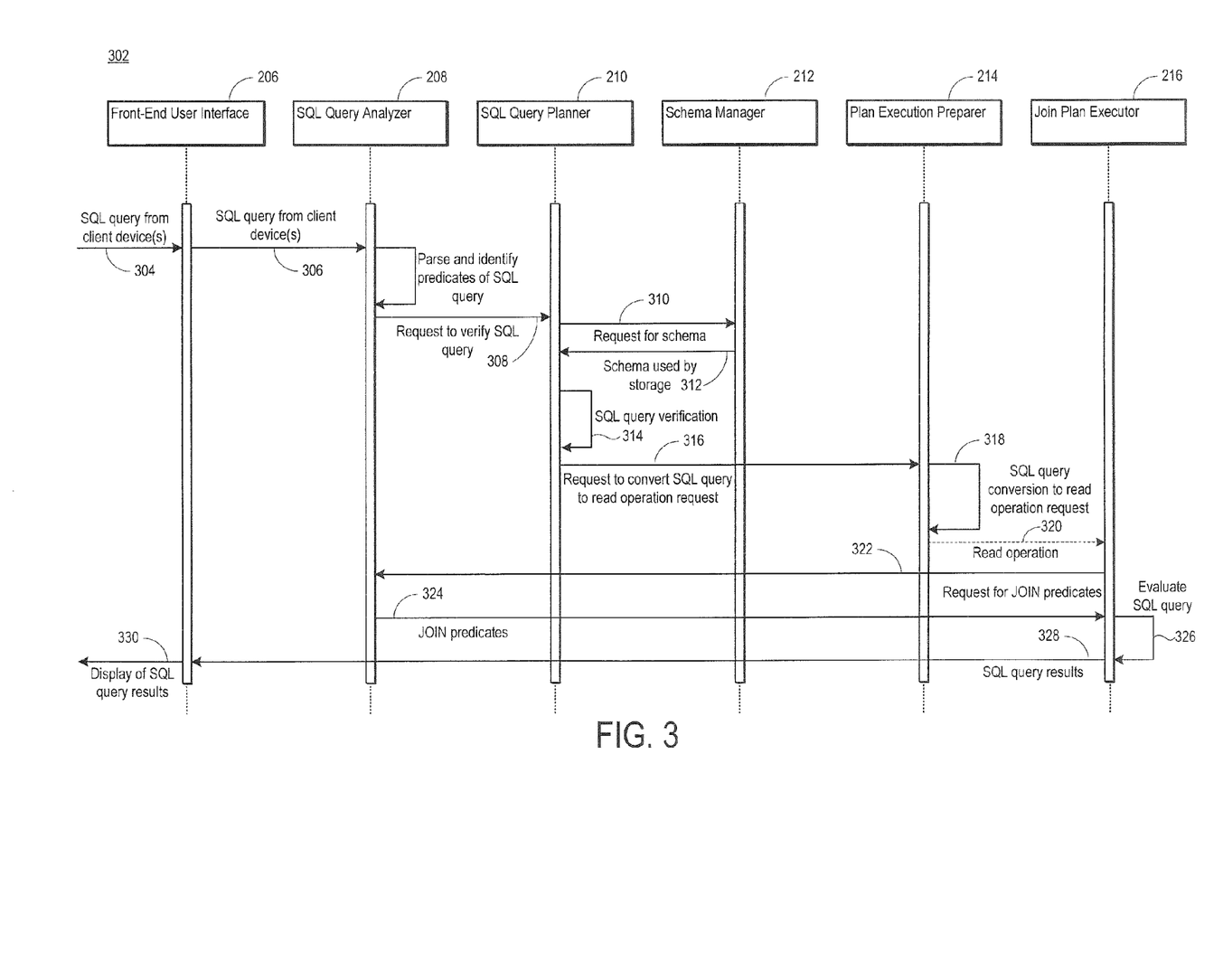
FIG. 3 illustrates an example of message passing that may occur among various components and systems of the relational interface system shown in FIG. 2 and according to aspects of the disclosure.

FIG. 3 illustrates an example of message passing 302 that may occur among various components and systems of the relational interface system 104 shown in FIG. 2 and according to aspects of the disclosure. Initially, the front-end user interface 206 may receive a SQL query from one or more of the client devices 114-118 (Message 304). The front-end user interface 206 may then communicate the received SQL query to the SQL query analyzer 208 (Message 306). As discussed above, the SQL query analyzer 208 may parse and identify the predicates of the received SQL query. The SQL query analyzer 208 may further deconstruct the conjuncts of the predicates of the received SQL query.

The SQL query analyzer 208 may then request verification of the query conditions on the received SQL query from the SQL query planner 210 (Message 308). To verify the one or more query conditions on the received SQL query, the SQL query planner 210 may request one or more database schemas from the schema manager 212 (Message 310/Message 312), and the SQL query planner may evaluate the received SQL query against the requested database schemas (Operation 314).

Thereafter, the SQL query planner 210 may request a read operation conversion of the received SQL query (Message 316). As discussed previously, the plan execution preparer 214 may perform the read operation request conversion (Operation 318).

The read operation request may be sent to one or more of the hierarchical data storages 106-112, which may result in the hierarchical data storages 106-112 transmitting a hierarchically clustered data stream to the relational interface system 104 (Operation 320). The join plan executor 216 may handle the decoding of the records within the hierarchically clustered data stream and the evaluation thereof. In one example, the join plan executor 216 may request the JOIN predicates and/or conjuncts from the SQL query analyzer 208 (Message 322), which may then communicate the requested JOIN predicates and/or conjuncts to the join plan executor 216 (Message 324). The join plan executor 216 may then evaluate the received predicates and/or conjuncts over one or more records or record combinations decoded from the received hierarchically clustered data stream (Operation 326). The join plan executor 216 may then perform one or more join operations of the received SQL query for the records satisfying the received predicates and/or conjuncts. The join plan executor 216 may then communicate the results of the join operation to the front-end user interface 206 (Message 328), which may then communicate those results to the one or more client devices 114-118 that initially sent the SQL query (Message 330). As discussed previously, communication of the record results may include displaying the record results on a graphical user interface, on a command line interface, or by transmitting the record results via an API or the like.

In this manner, the relational interface system 104 represents an advancement over current technologies for accessing hierarchically organized data storages because the non-buffering read operation may be performed once on the one or more hierarchically organized data storages such that the relational interface system need not make multiple read requests of the same data storage. Moreover, the non-buffering read operation may be achieved with a fixed bound to the amount of buffering. In addition, the described systems and methods also reduce the elapsed time between the time a request is sent from the client device to the system, until the time the client device has received the response to its request.

Accordingly, reading and joining operations performed by the relational interface system 104 significantly reduce the amount of resources (e.g., processor cycles, seek/read times, random-access memory, etc.) needed in order to retrieve and join multiple database tables when one or more SQL queries are received, such as SQL queries having the "JOIN" operation, the "LEFT OUTER JOIN" operation, and other such operations.

As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus for conducting a hierarchical join on a hierarchically clustered data stream, the apparatus comprising:
　a memory configured to store a query condition that determines whether a query is suitable for performing a non-buffering read operation on a hierarchical data storage; and
　a processor in communication with the memory, the processor being configured to:
　　receive a query;
　　evaluate the query for the query condition;
　　and,
　　when the query satisfies the query condition:
　　　perform a non-buffering read operation on the hierarchical data storage based on the read operation query, wherein the non-buffering read operation results in a hierarchically clustered data stream;
　　　evaluate the hierarchically clustered data stream according to at least one predicate of the SQL query to obtain a plurality of record results; and
　　　transmit the plurality of record results to a client device.

2. The apparatus of claim 1, wherein the query condition establishes that the query is valid for performing the non-buffering read operation when a plurality of tables identified in the query are top-down hierarchical.

3. The apparatus of claim 2, wherein the processor is configured to evaluate the query for the query condition by evaluating a database schema for the hierarchical data storage.

4. The apparatus of claim 2, wherein the query condition specifies that the plurality of tables identified in the query are top-down hierarchical when each table of the plurality of tables is only a proper ancestor or a proper descendant of another table in the plurality of tables.

5. The apparatus of claim 1, wherein the query condition establishes that the query is valid for performing the non-buffering read operation when the at least one predicate of the query specifies that, when a record of a first table is to be joined to records of a second table:
　the records of the second table are descendants of the record of the first table; and
　the record of the first table is not joined to the records of the second table that are not descendants of the record of the first table.

6. The apparatus of claim 5, wherein the processor is configured to evaluate the query for the query condition by confirming that a prefix of a primary key value of at least one record of the records of the second table comprises a primary key value of the record of the first table.

7. The apparatus of claim 1, wherein the query condition establishes that the query is valid for performing the non-buffering read operation when the query comprises only one operation type following a first instance of the operation type.

8. The apparatus of claim 1, wherein the query condition establishes that the query is valid for performing the non-buffering read operation when a first join condition on an ancestor table is not met, a second join condition on a descendant table is also not met.

9. The apparatus of claim 8, wherein the processor is configured to evaluate the query for the query condition by determining that the at least one predicate comprises a conjunct of the form "X.A=Y.B," where:
　X is a first table;
　A is a first column of the first table;
　Y is a second table; and
　B is a second column of the second table.

10. A method for conducting a hierarchical join on a hierarchically clustered data stream, the method comprising:
　storing, in a computer-readable memory, a query condition that determines whether a query is suitable for performing a non-buffering read operation on a hierarchical data storage
　receiving, with a processor in communication with the computer-readable memory, a query;
　evaluating the query for the query condition;
　and,
　when the query satisfies the query condition:
　　performing a non-buffering read operation on the hierarchical data storage based on the read operation query, wherein the non-buffering read operation results in a hierarchically clustered data stream;
　　evaluating the hierarchically clustered data stream according to at least one predicate of the query to obtain a plurality of record results; and transmitting the plurality of record results to a client device.

11. The method of claim 10, wherein the query condition establishes that the query is valid for performing the non-buffering read operation when a plurality of tables identified in the query are top-down hierarchical.

12. The method of claim 11, wherein evaluating the query for the query condition comprises evaluating a database schema for the hierarchical data storage.

13. The method of claim 12, wherein the query condition establishes that the query is valid for performing the non-buffering read operation when the at least one predicate of the query specifies that, when a record of a first table is to be joined to records of a second table:
the records of the second table are descendants of the record of the first table; and
the record of the first table is not joined to the records of the second table that are not descendants of the record of the first table.

14. The method of claim 13, wherein evaluating the query for the query condition comprises confirming that a prefix of a primary key value of at least one record of the records of the second table comprises a primary key value of the record of the first table.

15. The method of claim 11, wherein the query condition establishes that the query is valid for performing the non-buffering read operation when a first join condition on an ancestor table is not met, a second join condition on a descendant table is also not met.

16. The method of claim 15, wherein evaluating the query for the query condition by determining that the at least one predicate comprises a conjunct of the form "X.A=Y.B," where:
X is a first table;
A is a first column of the first table;
Y is a second table; and
B is a second column of the second table.

17. The method of claim 10, wherein the query condition establishes that the query is valid for performing the non-buffering read operation when the query comprises only one operation type following a first instance of the operation type.

18. The method of claim 10, wherein evaluating the query for the query condition comprises determining whether, after an instance of a "LEFT OUTER JOIN" operation type in the query, no other variations of a "JOIN" operation appear other than the "LEFT OUTER JOIN" operation type.

19. A computer-readable medium having computer-readable instructions stored thereon that, when executed by a processor, cause a processor to perform a method, the method comprising:
storing, in a computer-readable memory, a query condition that determines whether a query is suitable for performing a non-buffering read operation on a hierarchical data storage
receiving, with a processor in communication with the computer-readable memory, a query;
evaluating the query for the query condition; and,
when the query satisfies the query condition:
performing a non-buffering read operation on the hierarchical data storage based on the read operation query, wherein the non-buffering read operation results in a hierarchically clustered data stream;
evaluating the hierarchically clustered data stream according to at least one predicate of the query to obtain a plurality of record results; and
transmitting the plurality of record results to a client device.

* * * * *